United States Patent
Wallrabenstein

(10) Patent No.: US 9,292,692 B2
(45) Date of Patent: Mar. 22, 2016

(54) SYSTEM AND DEVICE FOR VERIFYING THE INTEGRITY OF A SYSTEM FROM ITS SUBCOMPONENTS

(71) Applicant: Sypris Electronics, LLC, Tampa, FL (US)

(72) Inventor: John Ross Wallrabenstein, West Lafayette, IN (US)

(73) Assignee: Sypris Electronics, LLC, Tampa, FL (US)

( * ) Notice: Subject to any disclaimer, the term of this patent is extended or adjusted under 35 U.S.C. 154(b) by 0 days.

(21) Appl. No.: 14/746,090

(22) Filed: Jun. 22, 2015

(65) Prior Publication Data

US 2015/0317481 A1   Nov. 5, 2015

Related U.S. Application Data

(63) Continuation-in-part of application No. 14/704,947, filed on May 5, 2015.

(60) Provisional application No. 62/150,586, filed on Apr. 21, 2015, provisional application No. 61/988,848, filed on May 5, 2014, provisional application No. 62/128,920, filed on Mar. 5, 2015, provisional application No. 62/150,254, filed on Apr. 20, 2015.

(51) Int. Cl.
*G06F 21/57* (2013.01)
*H04L 9/32* (2006.01)

(52) U.S. Cl.
CPC ..... *G06F 21/57* (2013.01); *H04L 9/32* (2013.01); *H04L 9/3221* (2013.01); *G06F 2221/034* (2013.01)

(58) Field of Classification Search
CPC ..... G06F 21/57; G06F 2221/034; H04L 9/32; H04L 9/3221
See application file for complete search history.

(56) References Cited

U.S. PATENT DOCUMENTS

| 8,918,647 B1 | 12/2014 | Wallrabenstein | |
|---|---|---|---|
| 9,032,476 B2 * | 5/2015 | Potkonjak | G06F 21/34 726/2 |
| 2003/0204743 A1 * | 10/2003 | Devadas | G06F 21/31 726/9 |
| 2008/0133912 A1 * | 6/2008 | Yamamoto | H04L 9/3221 713/168 |
| 2009/0083833 A1 * | 3/2009 | Ziola | G06F 21/31 726/2 |
| 2010/0122093 A1 * | 5/2010 | Tuyls | G06F 21/33 713/180 |
| 2011/0099117 A1 * | 4/2011 | Schepers | G06F 21/305 705/318 |
| 2013/0142329 A1 * | 6/2013 | Bell | H04L 9/0866 380/44 |
| 2014/0093074 A1 * | 4/2014 | Gotze | H04L 9/0866 380/45 |
| 2014/0108786 A1 * | 4/2014 | Kreft | H04L 9/3278 713/156 |

(Continued)

OTHER PUBLICATIONS

Feiri et al., "Efficient and Secure Storage of Private Keys for Pseudonymous Vehicular Communication", Nov. 2013, ACM, pp. 9-18.*

(Continued)

*Primary Examiner* — Matthew Smithers
(74) *Attorney, Agent, or Firm* — Law Office of Thomas J. Brindisi

(57) ABSTRACT

A system and device for verifying the integrity of a system from its components, the system comprising a plurality of components each having a physical state, the system and the device comprising a processor that is connected to each of the components, the processor configured to verify systemic integrity by performing verification on some or all specified components. The verification may be individual (1, 1) or threshold (n, 1), and may be interactive or non-interactive.

15 Claims, 2 Drawing Sheets

(56) References Cited

U.S. PATENT DOCUMENTS

2014/0189890 A1* 7/2014 Koeberl .................. G06F 21/70
726/34
2015/0058928 A1* 2/2015 Guo ........................ H04L 63/08
726/3

OTHER PUBLICATIONS

Sadeghi et al., Short Paper: Lightweight Remote Attestation using Physical Functions, Jun. 2011, ACM, pp. 109-114.*
Owusu et al., "OASIS: On Achieving a Sanctuary for Integrity and Secrecy on Untrusted Platforms", ACM, pp. 13-24.*
Asim et al, "Physical Unclonable Functions and Their Applications to Vehicle System Security," Vehicular Technology Conference, VTC Spring 2009, IEEE 69th.
Rigaud (editor) in "D3.1 Report on Protocol choice and implementation," Holistic Approaches for Integrity of ICT-Systems (2014).
Ibrahim et al., "Cyber-physical security using system-level pufs," Wireless Communications and Mobile Computing Conference (IWCMC), 2011 7th Int'l, IEEE.
Peeters, "Security Architecture for Things That Think," Diss. Ph. D. thesis, KU Leuven, Jun. 2012.
Peeters et al., "Toward More Secure and Reliable Access Control," Pervasive Computing, IEEE 11:3 (IEEE Computer Society 2011).
Krzywiecki et al., "Coalition resistant anonymous broadcast encryption scheme based on PUF," Trust and Trustworthy Computing (Springer Berlin Heidelberg 2011).
Khoshroo et al., "Design and Evaluation of FPGA-based Hybrid Physically Unclonable Functions," Master Thesis (Western University, Ontario, 2013).
Ruan et al., "Elliptic curve ELGamal threshold-based key management scheme against compromise of distributed RSUs for VANETs," Journal of Information Processing 20:4 (2012) (electronic pre-print).
Duc et al., "A survey on RFID security and provably secure grouping-proof protocols," Int'l J. Internet Tech. and Secured Transactions, 2:3/4 (2010).
Ertaul et al., "ECC Based Threshold Cryptography for Secure Data Forwarding and Secure Key Exchange in MANET (I)," Networking 2005, 4th Int'l IFIP-TC6 Networking Conference, Waterloo, Canada (Springer Berlin Heidelberg 2005).
Pfaffhauser, "Protocols for MPC based on Unclonability," Master Thesis (ETH Zurich 2011).
Garcia-Alfaro, "Security Threat Mitigation Trends in Low-cost RFID Systems," Data Privacy Management and Autonomous Spontaneous Security (Springer Berlin Heidelberg 2010).
Krzywiecki et al., "Collusion Resistant Anonymous Broadcast Encryption Scheme based on PUF," TRUST 2011, Pittsburgh.

* cited by examiner

SYSTEM AND DEVICE FOR VERIFYING THE INTEGRITY OF A SYSTEM FROM ITS SUBCOMPONENTS

REFERENCE TO RELATED APPLICATIONS

This application is a continuation-in-part of U.S. patent application Ser. No. 14/704,947 filed May 5, 2015, and claims the benefit of the priority of and incorporates by reference U.S. Provisional Patent Application Ser. No. 61/988,848 filed May 5, 2014 ("the '848 application"), Ser. No. 62/128,920 filed Mar. 5, 2015 ("the '920 application"), and Ser. No. 62/150,586 filed Apr. 21, 2015 ("the '586 application), and claims the benefit of the priority of U.S. Provisional Patent Application Ser. No. 62/150,254 filed Apr. 20, 2015.

FIELD OF THE INVENTION

The present invention relates to integrity verification of systems comprising electronic components.

BACKGROUND OF THE INVENTION

In many applications, it can be useful to employ means for verifying the integrity of a system by interrogating the components it is composed of. For example, a weapon system may require components to be internally validated during a boot process, or a vehicle may validate critical electronic control units on startup. Prior art typically accomplishes the verification of a component through a demonstration that it possesses a secret value, for example, through a zero knowledge proof of knowledge. This method of verification, however, may be associated with one or more constraints relating to hardware integrity or the security of private information. As to hardware integrity, existing component authentication protocols only verify that an entity possesses a private value, and typically just infer hardware integrity if the device has a physical construction designed to deter tampering (e.g., a hardware security module). Even with a tamper resistant physical construction, the integrity of the physical construction is not inextricably linked to the integrity of the device itself. As to the security of private information, existing component authentication protocols require that the component store and protect private information (typically a private key for cryptographic authentication protocols). If the private information is compromised, it may be possible for an adversary to masquerade as a valid component in the larger system.

Asim et al. ("Physical Unclonable Functions and Their Applications to Vehicle System Security," Vehicular Technology Conference, VTC Spring 2009, IEEE 69th) discusses using PUFs in vehicle components as a method for regenerating private keys, which is a well-known application. However, they fail to give an enabling construction allowing a system-wide identity to be constructed from each of the individual components.

Rigaud (editor) in "D3.1 Report on Protocol choice and implementation," Holistic Approaches for Integrity of ICT-Systems (2014) describes applying PUFs to chips as a method for authenticating a chip (the device-under-test) to the testing equipment, which could detect fake chips. However, there is no construction that would enable a system-wide identity to be constructed from each of the individual chips.

Ibrahim et al. ("Cyber-physical security using system-level pufs," Wireless Communications and Mobile Computing Conference (IWCMC), 2011 7th Int'l, IEEE) discusses the general concept of combining PUFs from distinct system components to form a combined identity, but they fail to give an enabling construction. In their concluding remarks, the authors specifically state that they lack a realized solution.

Peeters ("Security Architecture for Things That Think," Diss. Ph. D. thesis, KU Leuven, June 2012) describes using a PUF in resource-constrained devices for regenerating a share from an external threshold system composed of a user's devices. The PUF is applied solely as a storage mechanism, eliminating the need to store the share in plaintext on the device. However, no internal threshold application is given, nor is the challenge-helper pair ever refreshed.

Krzywiecki et al. ("Coalition resistant anonymous broadcast encryption scheme based on PUF," Trust and Trustworthy Computing. Springer Berlin Heidelberg, 2011, 48-62) describe a broadcast encryption scheme where subscribers must invoke a PUF-enabled card to regenerate shares of a threshold system. The construction requires an incorruptible distributor to store and protect raw PUF output. The system is designed to allow an end device to recover a symmetric key only if it has not been revoked by the broadcaster. The PUF-enabled receiving device must construct the full symmetric key from its shares in order to decrypt the incoming transmission. No internal threshold application is given, nor is the challenge-helper pair ever refreshed.

Khoshroo et al. ("Design and Evaluation of FPGA-based Hybrid Physically Unclonable Functions," Diss. Western University London, 2013) describe a modified secret sharing scheme, where each player's share is a challenge-helper pair generated from the dealer's PUF. The actual shares for the threshold system are recovered only given both the challenge-helper pair and access to the PUF, which regenerates the share from the challenge-helper pair. As each share is worthless without access to the PUF, an adversary can compromise all of the end devices, and yet is unable to recover the secret without access to the PUF. No cryptographic operations are possible over these pseudo-shares. The shared secret may only be recovered if all of the shares are regenerated, and the dealer is assumed to be incorruptible. The dealer's PUF is used only as a method for obfuscating the shares that are distributed to players.

SUMMARY OF THE INVENTION

Various embodiments of the invention provide for the verification of a set of components of an electronic system, such that the integrity of the system as a whole is deduced therefrom. One embodiment of the invention employs physical unclonable functions (PUFs) for detecting hardware tampering in integrated circuits, and zero knowledge proof protocols for authentication. In one embodiment this is done by individual verification of components; in another embodiment, relevant components may be verified together, with each generating a local proof of validity and collaborating to combine their local proofs into a single proof that validates the integrity of the system as a whole.

In another embodiment, which may be provided individually or in combination with one or more of the foregoing embodiments, systemic trust may be established even if the system's components themselves are untrusted, by employing a hardware root-of-trust that iteratively extends the trust boundary as each component is verified.

DETAILED DESCRIPTION OF EMBODIMENTS

Figure 1:
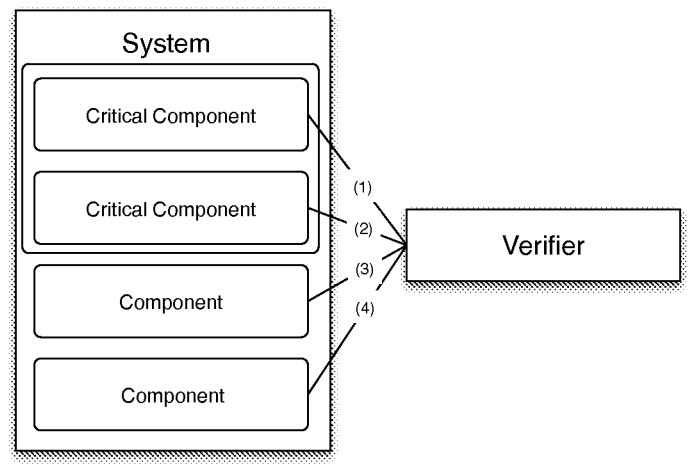
FIG. 1 is a system diagram illustrating (1, 1) integrity verification of components.

In one embodiment, each of a system's n relevant components may be interrogated (e.g., sequentially) through an interactive or non-interactive zero-knowledge proof of knowledge. Authentication algorithms such as those disclosed in the '848 and '586 applications (elliptic curve-based) or in U.S. Pat. No. 8,918,647 (discrete log-based; "the '647 patent," which is incorporated here by reference), for example, may be used to establish the hardware integrity of components having trusted means of gathering private information, such as physical unclonable functions. A PUF links the evaluation of a function with the hardware on which it is executed, such that any adversarial tampering of the hardware affects the evaluation of the function. By further linking the PUF output with the construction of the zero knowledge proof, the hardware integrity of the device can be deduced by an external verifier from its ability to successfully complete the zero knowledge proof protocol. The PUF may also be configured to dynamically generate private information from only public information, so that components need not store and protect private information. In another embodiment, integrity of the system may be established through a single collaborative response from all (or a subset of) the components by constructing a threshold proof that requires all or some subset of the n components to be functioning correctly. In that case, rather than construct a separate proof for each of the n components, they collaboratively construct a single proof that establishes the validity of all or a subset of the n components simultaneously.

One embodiment of a component may comprise a Xilinx Artix 7 field programmable gate array (FPGA) platform, equipped, e.g., with 215,000 logic cells, 13 Megabytes of block random access memory, and 700 digital signal processing (DSP) slices. In an embodiment employing elliptic curve cryptography, for example, the hardware mathematics engine may be instantiated in the on-board DSP slices, with the PUF construction positioned within the logic cells, and a logical processing core including an input and output to the PUF and constructed to control those and the component's external input and output and to perform algorithms (sending elliptic curve and other mathematical calculations to the math engine) such as those described above. A verifier may comprise Xilinx Artix 7 FPGA as described above, or server computer having an 8-core 3.1 GHz processor and 16 GB of RAM, or another suitable means, connected, e.g., by wire or wirelessly to the system's components.

Component Authentication

In the individual interrogation method of verification, or "(1, 1) verification," each component interacts directly with the verifier V. In interactive (1, 1) verification, the verifier V issues a nonce as part of a two message protocol with each component. In non-interactive (1, 1) verification, each component sends only a single message to the verifier V, and includes a value equivalent to a nonce (e.g., a timestamp) that cannot be manipulated by the component. In the collaborative method of verification, or "(n, 1) verification," a subset of the n components collaboratively generate a single joint proof, which convinces the verifier V of the integrity of the subset of n components. In interactive (n, 1) verification, the verifier V issues a nonce as part of a two message protocol, where a subset of components act jointly and send only a single response. In non-interactive (n, 1) verification, a subset of components send only a single message to the verifier V, which includes a value equivalent to a nonce (e.g., a timestamp) that cannot be manipulated by any subset of the components.

For the purposes of providing a detailed description of an embodiment, the example of an elliptic curve-based construction is utilized, with E denoting an elliptic curve defined over a finite field $\mathbb{F}_p$, where G is a base point of order q. One of ordinary skill will recognize that the invention (be it (1, 1), (n, 1), and/or layered security) can be readily implemented using various other constructions (with just one example alternative being the '647 patent's discrete logarithm construction). Thus the invention is not limited to any particular construction, except where specifically stated in the claims.

A zero knowledge authentication protocol typically requires a unique and random nonce to be issued by the verifier V during each protocol invocation. The nonce prevents the proof from the verifier from being reused in the future (i.e., a replay attack), and the proving component must not be able to influence its value. For example, the '848 application discloses a derived token-based zero knowledge proof protocol, the teachings regarding which are incorporated here by reference, summarized as follows:

---

Interactive Authentication Algorithm for an Individual Device for Server s do
   Device d ← {c, E, G, p, q, P, N} where N is a nonce and P is the helper string
for PUF Device d do
   x ← Hash(c, E, G, p, q)
   $p_i^{priv}$ ← D(PUF(x) ⊕ P) where PUF(·) is the PUF function and D is an error decoding scheme
   r ← random ∈ $\mathbb{F}_q$, a random group element
   B ← r · G mod p
   c' ← Hash(G, B, A, N), (a hash, not a challenge)
   m ← r + c' · $p_i^{priv}$ mod q
   Server s ← {B, m}
for Server s do
   c' ← Hash(G, B, A, N)
   D ← m · G − c' · A mod p $$\text{Device } d \leftarrow \begin{cases} \text{accept:} & D = B \\ \text{deny:} & D \neq B \end{cases}$$

---

This algorithm proceeds as follows:

Prior to authentication, the server has issued a random challenge variable c to the device, which is used to form a PUF challenge input x. The enrollment server and device agree on an elliptic curve E defined over a finite field $\mathbb{F}_p$, where G is a base point of order q. The device $d_i$ returns a public commitment $A = p_i^{priv} \cdot G$ to the server, which links its PUF to the challenge variable c (on which the challenge input x depends), and a public helper value P that will correct the noisy PUF output.

When the server wishes to authenticate the device, it issues an authentication request and the tuple {c, E, G, p, q, P, N} is sent to the device.

The device constructs the PUF challenge input x ← H(c,E,C,p,q), which links the challenge variable c with the public parameters of the elliptic curve, and passes it to the PUF yielding output O', which is ⊕'d with helper value P and the result decoded using an error decoding scheme D.

As the PUF output is noisy, when queried on challenge x again in the future, the new output O' may not exactly match the previous output value O. However, it is assumed that O and O' will be t-close with respect to some distance metric (e.g. Hamming distance). Thus, an error correcting code may be applied to the PUF output such that at most t errors will still recover O. During enrollment, error correction was applied over the random group element $p_i^{priv}$, and then this value was blinded with the output of the PUF O, so that the final helper value $P=ECC(p_i^{priv}) \oplus O$ reveals no information about $p_i^{priv}$. During recovery for authentication, computing the exclusive- or of $ECC(\text{rand}) \oplus O \oplus O'$ will return $p_i^{priv}$ whenever O and O' are t-close. This process is referred to as fuzzy extraction, and is detailed further in the '848 application (see "Gen Algorithm,", "Rep Algorithm," and Definition 3).

The device chooses a random group element $r \in \mathbb{F}_q$ and computes point $B=r \cdot G$.

The server's nonce N is linked to the proof by constructing a hash c' that also combines the base point G, the device's nonce B, and its public key A.

The device constructs the zero knowledge proof token (B, $m=r+c' \cdot p_i^{priv} \mod p$), and returns this tuple to the server.

The server verifies that:

$$\{(m \cdot G) - (c' \cdot A)\} = \{((r + c' \cdot p_i^{priv}) \cdot G) - (c' \cdot p_i^{priv} \cdot G)\}$$
$$= \{r \cdot G +' c \cdot p_i^{priv} \cdot G -' c \cdot p_i^{priv} \cdot G\}$$
$$= r \cdot G$$
$$= B$$

(1, 1) Verification

In (1, 1) verification, the verifier individually interrogates each component in order to establish the integrity of the larger system; all (or all specified) components successfully complete a zero knowledge proof with the verifier in order for the verification of the integrity of the system as a whole to succeed. Referring to FIG. 1, the verifier is illustrated sequentially validating each of the system's components. At first verification 1 and second verification 2, the verifier validates each critical system component. At third verification 3 and fourth verification 4, the verifier validates each non-critical system component. An interactive version of this process is set forth in Algorithm 1.

---

Algorithm 1 Interactive (1, 1) System Verification

--- for each Component Device $d_i \in \bar{\mathcal{D}}$ do
    for Verifier $\mathcal{V}$ do
        $d_i \leftarrow \{c, G, p, P_i, N_i\}$ where $N_i$ is a nonce and $P_i$ is the helper string
    $x_i \leftarrow \text{Hash}(c_i, E, G, n)$
    $p_i^{priv} \leftarrow D(\text{PUF}(x_i) \oplus P_i)$ where $\text{PUF}(\cdot)$ is the PUF output function and D is an error decoding scheme
    $A_i = p_i^{priv} \cdot G \mod p$
    $r_i \leftarrow \text{random} \in \mathbb{F}_q$, a random group element
    $B_i \leftarrow r_i \cdot G \mod p$
    $c_i' \leftarrow \text{Hash}(G, B_i, A_i, N_i)$
    $m_i \leftarrow r_i + c_i' \cdot p_i^{priv} \mod q$
    Verifier $\mathcal{V} \leftarrow \{B_i, m_i\}$
    for Verifier $\mathcal{V}$ do
        $A_i = p_i^{priv} \cdot G \mod p$ (stored from device enrollment)
        $c_i' \leftarrow \text{Hash}(G, B_i, A_i, N_i)$
        $D_i \leftarrow m_i \cdot G - c_i' \cdot A_i \mod p$ $$\text{Component Device } d_i \leftarrow \begin{cases} \text{accept:} & D_i = B_i \\ \text{deny:} & D_i \neq B_i \end{cases}$$

for Verifier $\mathcal{V}$ do

---

Algorithm 1 Interactive (1, 1) System Verification

---

$$\text{System} \leftarrow \begin{cases} \text{accept:} & \forall i, D_i = B_i \\ \text{deny:} & \exists i \text{ s.t. } D_i \neq B_i \end{cases}$$

---

The requirement for communication from the verifier V in the interactive zero knowledge proof is to obtain a nonce value specific to the current proof. This prevents an eavesdropping adversary from using previous proofs from a valid component to successfully complete an authentication protocol and masquerade as a valid component. A non-interactive zero knowledge proof removes this communication requirement. A non-interactive version of Algorithm 1 can be made by configuring the component to generate a nonce in a manner that prevents the proving component from manipulating the proof. To accomplish this, the component device $d_i$ constructs the nonce $N \leftarrow \text{Hash}(p_i^{priv} \cdot G \mod p \| \tau)$ where $\tau$ is a timestamp and $\|$ denotes concatenation. The timestamp ensures that previous proofs constructed by the proving component cannot be replayed by an adversary in the future, while the hash function ensures that the proving component cannot manipulate the challenge in an adversarial manner. The verifier preferably checks that the timestamp is reasonably current (e.g., second granularity) and monotonically increasing to prevent replay attacks. Alternately, globally-synchronized clocks may be used rather than a timestamp, such as if network latency is not significant. A non-interactive version of (1, 1) verification is set forth in Algorithm 2, with each component locally choosing a current timestamp $\tau$ to construct its nonce.

---

Algorithm 2 Non-Interactive (1, 1) System Verification

--- for each Component Device $d_i \in \bar{\mathcal{D}}$ do
    $x_i \leftarrow \text{Hash}(c_i, E, G, n)$
    $p_i^{priv} \leftarrow D(\text{PUF}(x_i) \oplus P_i)$ where $\text{PUF}(\cdot)$ is the PUF output function and D is an error decoding scheme
    $A_i = p_i^{priv} \cdot G \mod p$
    $r_i \leftarrow \text{random} \in \mathbb{F}_n$, a random group element
    $B_i \leftarrow r_i \cdot G \mod p$
    $N_i \leftarrow \text{Hash}(A \| \tau)$ where $\tau$ is the current timestamp
    $c_i' \leftarrow \text{Hash}(G, B_i, A_i, N_i)$
    $m_i \leftarrow r_i + c_i' \cdot p_i^{priv} \mod q$
    Verifier $\mathcal{V} \leftarrow \{B_i, m_i, \tau\}$
    for Verifier $\mathcal{V}$ do
        $A_i = p_i^{priv} \cdot G \mod p$ (stored from device enrollment)
        $N_i \leftarrow \text{Hash}(A \| \tau)$
        $c_i' \leftarrow \text{Hash}(G, B_i, A_i, N_i)$
        $D_i \leftarrow m_i \cdot G - c_i' \cdot A_i \mod p$ $$\text{Component Device } d_i \leftarrow \begin{cases} \text{accept:} & D_i = B_i \wedge \text{check}(\tau) \\ \text{deny:} & D_i \neq B_i \vee !\text{check}(\tau) \end{cases}$$

for Verifier $\mathcal{V}$ do $$\text{System} \leftarrow \begin{cases} \text{accept:} & \forall i, D_i = B_i \wedge \text{check}(\tau_i) \\ \text{deny:} & \exists i \text{ s.t. } D_i \neq B_i \vee !\text{check}(\tau_i) \end{cases}$$

---

(n, 1) Verification

Referring to the threshold methods disclosed in the '920 application, which are incorporated by reference, for example, to satisfy the requirement that all k critical components are functioning properly, a (k, k) sharing can be constructed such that all k components must collaborate to complete a joint proof. For a system that comprises critical components as well as non-critical or redundant components, it may be desired to verify that all critical and some non-critical or redundant components are operational. One method for verifying such a system is to generate a separate sharing for each set, whereby the verifier checks two proofs.

Figure 2:
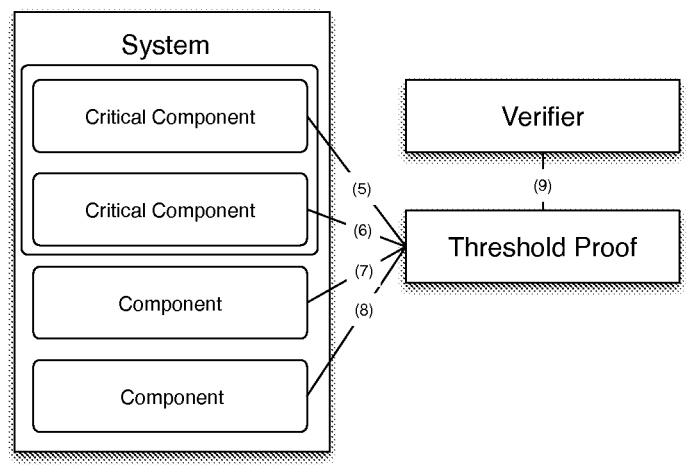
FIG. 2 is a system diagram illustrating (n, 1) integrity verification of components.

Alternately, both critical and non-critical components may be verified together using a single (t, n) threshold proof in which n shares are allocated so as to ensure integrity of all critical components and a specified subset of non-critical components. For example, assume there are two critical components (both of which must be operational) and two non-critical components (at least one of which must be operational). n=6 shares can be distributed with each critical component receiving two shares and each non-critical component receiving one, and the minimum number of shares for verification t being 5 (i.e., a (5, 6) sharing). If one of the critical components fails or both of the non-critical components fail, verification fails since the remaining operational components can only contribute a total of four shares; if both critical components and at least one non-critical component are operational, the five shares necessary for successful verification can be contributed. In general, this approach is referred to as constructing a threshold access structure, which enforces a set of rules (e.g., all critical components and half of the non-critical components must be functional for the system to authenticate) through the distribution of shares. As shown in FIG. 2, first threshold proof 5 and second threshold proof 6, the critical components contribute their local proofs. At third threshold proof 7 and fourth threshold proof 8, the remaining components contribute their local proofs to form a single, joint proof. At combined verification 9 the Verifier validates the joint proof (such as by Algorithm 6) to establish the validity of the system as a whole. Similarly, a (t, n) sharing can be constructed for redundant systems, such that t of the n redundant systems must be functioning to complete the proof. Thus, rather than complete O(n) proofs for n systems, the systems can jointly construct a single threshold proof to represent the system they compose.

Algorithm 3 illustrates an example of a subset of component devices $\overline{D} \subseteq D, |\overline{D}|=m \leq n$ constructing a joint threshold proof for the verifier V. Although in this example the verifier combines partial proofs (thus, implying O(n) work for V as the number of partial proofs is n), a secretary could instead combine the partial shares and forward the result to the verifier. As another alternative, the components could form a ring, and pass their partial shares to the next component, which combines their own partial proof before forwarding on to the next component. The Enrollment Algorithm, Distributed Key Generation Algorithm, and PUF-Retrieve are set forth in the '920 application.

---

Algorithm 3 Interactive Threshold Proof Construction

Goal: Perform threshold zero knowledge proof at time τ
One-Time Setup Stage for each System Device $d_i \in \overline{D}$ do
   Run Enrollment Algorithm
   Run Distributed Key Generation Algorithm
Evaluation Stage for Verifier $\mathcal{V}$ do
   Broadcast ephemeral nonce N to all $d_i \in \overline{D}$
   for all Participants $p_i \in \mathcal{P}$ do
     Recover share $r_i \leftarrow$ PUF-Retrieve($c_i$, helper$_i$)
     Choose a random $y_i \in \mathbb{F}_q$
     Compute and broadcast $B_i = y_i \cdot G \bmod p$ to all $d_i \in \overline{D}$
     Compute

---

Algorithm 3 Interactive Threshold Proof Construction $$B = y \cdot G = \sum_{i=1}^{t} B_i \bmod p$$

$$e = \text{Hash}(G, B, \mathcal{P}^{pub}, N)$$

$$M_i = y_i + r_i e \left( \prod_{\substack{j=1 \\ j \neq i}}^{t} \frac{-j}{i-j} \right) \bmod q$$

Send $(B_i, M_i)$ to verifier $\mathcal{V}$

---

Similarly, Algorithm 3 can be performed non-interactively. This is accomplished by replacing the verifier's nonce N with a timestamp τ generated by the components, as illustrated in Algorithm 4. The timestamp serves as a replacement for the server's randomness N, and prevents replay attacks by adding a temporal requirement to the proof. That is, the timestamp is monotonically increasing, and the verifier simply checks that the timestamp used in the proof is reasonably (e.g., second granularity) current.

---

Algorithm 4 Non-Interactive Threshold Proof Construction

Goal: Perform non-interactive threshold zero knowledge proof at time τ
One-Time Setup Stage for each System Device $d_i \in \overline{D}$ do
   Run Enrollment Algorithm
   Run Distributed Key Generation Algorithm
Evaluation Stage for all Participants $p_i \in \mathcal{P}$ do
   Fix current timestamp τ
   Recover share $r_i \leftarrow$ PUF-Retrieve($c_i$, helper$_i$)
   Choose a random $y_i \in \mathbb{F}_q$
   Compute and broadcast $B_i = y_i \cdot G \bmod p$ to all $d_i \in \overline{D}$
   Compute $$B = y \cdot G = \sum_{i=1}^{t} B_i \bmod p$$

$$e = \text{Hash}(G, B, \mathcal{P}^{pub}, \tau)$$

$$M_i = y_i + r_i e \left( \prod_{\substack{j=1 \\ j \neq i}}^{t} \frac{-j}{i-j} \right) \bmod q$$

Send $(B_i, M_i, \tau)$ to verifier $\mathcal{V}$

---

Algorithm 5 illustrates a further refinement of Algorithm 3 that incorporates updating the challenge-helper pair and share after each operation. The PUF-ShareUpdate and PUF-Store algorithms are set forth in the '920 application.

---

Algorithm 5 Interactive Threshold Proof Construction with Refreshing

Goal: Perform threshold zero knowledge proof at time τ
One-Time Setup Stage for each System Device $d_i \in \overline{\mathcal{D}}$ do
   Run Enrollment Algorithm
   Run Distributed Key Generation Algorithm
Evaluation Stage for Verifier $\mathcal{V}$ do
   Broadcast ephemeral nonce N to all $d_i \in \overline{\mathcal{D}}$ -continued Algorithm 5 Interactive Threshold Proof Construction with Refreshing for all Participants $p_j \in \mathcal{P}$ do
  Recover share $r_i^{(\tau)} \leftarrow$ PUF-Retrieve($c_i^{(\tau)}$, helper$_i^{(\tau)}$)
  Choose a random $y_i \in \mathbb{F}_q$
  Compute and broadcast $B_i = y_i \cdot G$ mod p to all $d_i \in \mathcal{D}$
  Compute $$B = y \cdot G = \sum_{i=1}^{t} B_i \bmod p$$

$$e = \text{Hash}(G, B, \mathcal{P}^{pub}, N)$$

$$M_i = y_i + r_i^{(\tau)} e \left( \prod_{\substack{j=1 \\ j \neq i}}^{t} \frac{-j}{i-j} \right) \bmod q$$

Send $(B_i, M_i)$ to verifier $\mathcal{V}$
  Update share
    $r_i^{(\tau+1)} \leftarrow$ PUF-Share-Update($r_i^{(\tau)}$)
  Store $r_i^{(\tau+1)}$ and update PUF challenge:
    $\{c_i^{(\tau+1)}, \text{helper}_i^{(\tau+1)}\} \leftarrow$ PUF-Store($r_i^{(\tau+1)}$)

Algorithm 6 Interactive Threshold Proof Verification for Verifier $\mathcal{V}$ do
  Upon receipt of $(B_i, M_i)_{1 \leq i \leq t}$, compute:

$$B = \sum_{i=1}^{t} B_i \bmod p$$

$$M = \sum_{i=1}^{t} M_i \bmod q$$

$$e = h(G, B, \mathcal{P}^{pub}, N)$$

Verify the proof against the group's public key $\mathcal{P}^{pub} = rG$:

$$B \stackrel{?}{=} M \cdot G - e \cdot \mathcal{P}^{pub} \bmod p$$
$$= (y + re) \cdot G - e \cdot (rG)$$
$$= yG + reG - reG$$
$$= yG$$

$$\text{Decision} \leftarrow \begin{cases} \text{accept:} & B = yG \\ \text{deny:} & B \neq yG \end{cases}$$

Layered Security

Figure 3:
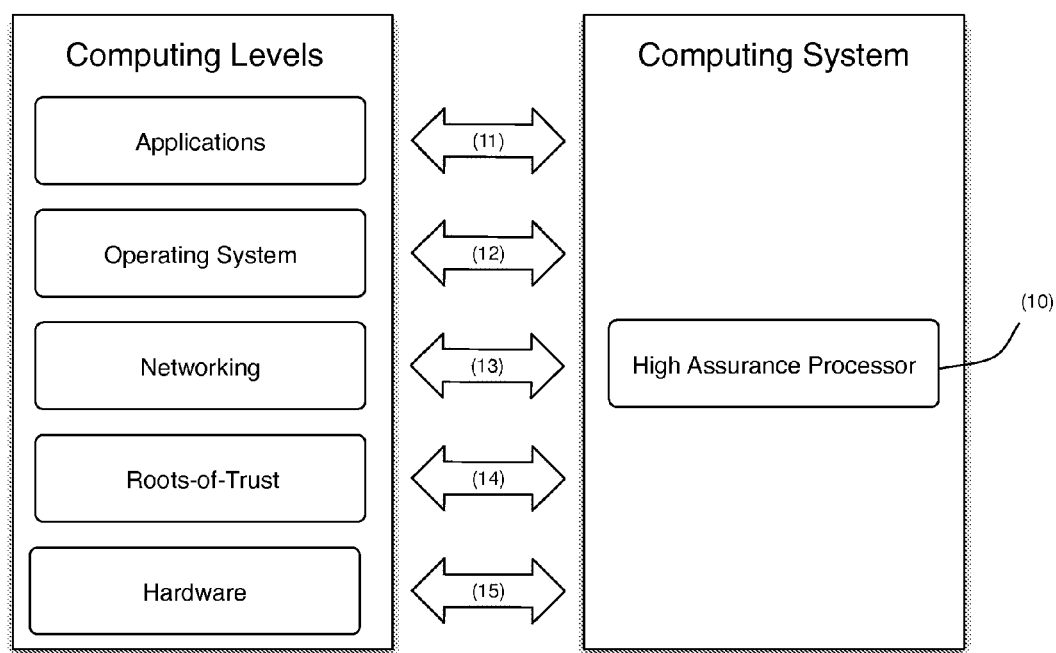
FIG. 3 illustrates a system establishing trust through layered security derived from a high assurance processor.

When the components themselves are unable to generate a proof of correctness, the integrity of the system as a whole must be derived from a root-of-trust. An additional embodiment of the invention is a system achieving a layered security approach across all computing levels by deriving a hardware root-of-trust from a high assurance processor. The high assurance processor is used to validate all layers in a computing architecture, providing secure boot control, change detection, alarm indicators and audit functions. FIG. 3 illustrates the high assurance processor in an exemplary computing architecture.

Secure computing architectures create a layered security approach, where the trusted boundary is iteratively extended from a core root-of-trust. For example, a trusted boot procedure assumes a minimal trust boundary (e.g., a root-of-trust, such as a trusted platform module (TPM)) and iteratively extends the trust boundary by validating each component of the system as it boots. This mitigates risk from components more susceptible to adversarial modification, such as the operating system or applications. The root-of-trust is used to detect modification to system components, and will only complete the boot sequence if all components are validated as correct. However, existing trusted boot systems typically rely on roots-of-trust that are assigned (rather than intrinsic) to the device. For example, TPMs hold a private key in protected memory that represents the identity of the system. Thus, an adversary that extracts the assigned identity is able to masquerade as the system. Further, existing systems do not provide intrinsic tamper detection, and rely on tamper detecting hardware enclosures for security. Existing roots-of-trust are illustrated in FIG. 3 at the root of trust layer 14, which is situated above the hardware layer.

One embodiment of the invention employs a high assurance processor based on a PUF that captures intrinsic and unique properties of the hardware and preferably provides intrinsic hardware tamper detection. As the PUF mapping is a function of the physical properties of the hardware, it can be used to generate a hardware-intrinsic identity that represents the physical state of the system. Referring to FIG. 3, high assurance processor 10, which is at the hardware layer, is established as the root-of-trust for the system and forms a layered security architecture interaction with application layer 11, operating system layer 12, network layer 13, root of trust layer 14, and hardware layer 15. The high assurance processor 10 addresses NIST SP 800-53 Rev. 4 ("Security and Privacy Controls for Federal Information Systems and Organizations") Security Capability, where trust is derived from interactions among system components. The high assurance processor 10 may be used in mutual reinforcement controls within the system, where the high assurance processor 10 may validate an existing root-of-trust and vice versa.

The high assurance processor 10 is preferably designed to interact with the system through common commercial standard interfaces (e.g., USB, Ethernet) to enable interaction with commercial-off-the-shelf devices without hardware modification, and integration and continued support may be achieved through firmware and/or software upgrades. At root of trust layer 14 the high assurance processor 10 may be used to extend and/or interact with existing roots-of-trust (e.g., TPM, ARM TrustZone). This enables a system with an existing trusted boot process to remain essentially unchanged, as the high assurance processor 10 can first validate the existing root-of-trust (which can subsequently complete the existing trusted boot process). At application layer 11 the high assurance processor 10 may be used to validate applications prior to execution, for example by storing a cryptographic hash of the application code or binary executable when it is first installed from a trusted source. The high assurance processor 10 signs the cryptographic hash, which may be stored on the system. Before an application may be executed by the system, the high assurance processor 10 first computes a cryptographic hash of the current application code or binary executable, validates its signature on the stored cryptographic hash, and validates that the two hash outputs match. If any of these checks fail, the high assurance processor 10 preferably halts execution of the application and issues an alarm.

What is claimed is:

1. A device for verifying the integrity of a system comprising a plurality of components each having a physical state and a physical unclonable function ('PUF') including a PUF input and a PUF output and constructed to generate, in response to the input of a specific challenge, an output value that is characteristic to: i) the PUF, ii) the component's physical state, and iii) the specific challenge; the device comprising a memory, and a processor connected to each of the PUF-containing components and configured to perform threshold verification by computing threshold cryptographic operations over multiple shares each associated with a specific component and a response from that component's PUF and combining those threshold cryptographic operations and checking whether a sufficient set of PUF-containing components represented thereby is valid.

2. The device of claim 1, wherein the processor is configured to perform zero knowledge proof authentication.

3. The device of claim 2, wherein the processor is further configured to perform elliptic curve cryptography.

4. The device of claim 1, wherein the processor is configured to perform interactive verification.

5. The device of claim 1, wherein the processor is configured to perform non-interactive verification.

6. The device of claim 1, wherein the processor is configured to perform verification of one or more specified groups of components.

7. The device of claim 6, wherein the system includes critical components and the processor is configured to perform verification on k critical components through a (k, k) sharing construction.

8. The device of claim 1, wherein the system includes a total of n critical and non-critical components and the processor is configured to perform verification through a (t, n) sharing construction.

9. A system of components configured to attest integrity of the system to a verifying device, each component having a physical state and comprising:

a) a physical unclonable function ('PUF') including a PUF input and a PUF output and constructed to generate, in response to the input of a specific challenge, an output value that is characteristic to i) the PUF, ii) the component's physical state, and iii) the specific challenge; and b) a processor connected to the PUF and configured to, in response to a verification request from the verifying device, provide an input to the PUF input and receive a response from the PUF output, and compute and convey to the verifying device a share for that PUF-containing component of a joint threshold proof associated with a specified set of PUF-containing components.

10. The device of claim 9, wherein the joint threshold proof is a zero knowledge proof.

11. The device of claim 10, wherein the system includes a total of n critical and non-critical components and the zero knowledge proof is based upon a (t, n) sharing construction.

12. The device of claim 10, wherein the zero knowledge proof is based upon an elliptic curve mathematical framework.

13. The device of claim 10, wherein the zero knowledge proof is based upon a (k, k) sharing construction.

14. The device of claim 10, wherein the zero knowledge proof is interactive.

15. The device of claim 10, wherein the zero knowledge proof is non-interactive.

* * * * *